US012589752B2

(12) United States Patent
Zhou

(10) Patent No.: US 12,589,752 B2
(45) Date of Patent: Mar. 31, 2026

(54) VEHICLE SENSOR DATA PROCESSING METHOD AND SYSTEM

(71) Applicant: Shenzhen Yinwang Intelligent Technologies Co., Ltd., Shenzhen (CN)

(72) Inventor: Wei Zhou, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 416 days.

(21) Appl. No.: 17/993,718

(22) Filed: Nov. 23, 2022

(65) Prior Publication Data

US 2023/0091758 A1      Mar. 23, 2023

Related U.S. Application Data

(63) Continuation of application No. PCT/CN2021/090244, filed on Apr. 27, 2021.

(30) Foreign Application Priority Data

May 25, 2020    (CN) .......................... 202010450031.2

(51) Int. Cl.
*B60W 50/00*      (2006.01)
*B60W 60/00*      (2020.01)

(52) U.S. Cl.
CPC .... *B60W 50/0098* (2013.01); *B60W 60/0015* (2020.02); *B60W 2420/408* (2024.01); *B60W 2556/35* (2020.02)

(58) Field of Classification Search
CPC ......... B60W 60/0015; B60W 2556/35; B60W 2420/408; B60W 30/12; B60W 30/16; B60W 30/162; B60W 30/165; B60W 30/17; B60W 30/182; B60W 50/082; G05D 1/0061; G05D 1/0088; G05D 1/021; G05D 1/0214; G05D 1/0221; G05D 1/0223; B60K 28/00–165; B60K 28/165
USPC ...... 701/23, 29.7, 30.4, 30.6, 63, 20.7, 30.8, 701/30.9, 31.1
See application file for complete search history.

(56) References Cited

U.S. PATENT DOCUMENTS

| | | | | |
|---|---|---|---|---|
| 9,834,223 B2 * | 12/2017 | Jammoussi | .......... | G08G 1/0141 |
| 11,587,367 B2 * | 2/2023 | Petousis | ................. | G07C 5/008 |

(Continued)

OTHER PUBLICATIONS

Michael Aeberhard et al., High-Level Sensor Data Fusion Architecture for Vehicle Surround Environment Perception, Nov. 2015, ResearchGate, pp. 1-7 (pdf).*

(Continued)

*Primary Examiner* — Manglesh M Patel
(74) *Attorney, Agent, or Firm* — Leydig, Voit & Mayer, Ltd.

(57)      ABSTRACT

A vehicle sensor data processing method implemented by a vehicle sensor data processing system includes: the vehicle sensor data processing system processes and fuses, by using a plurality of levels of control units, a signal sensed by a sensor, and a higher-level control unit makes a control decision based on received data of a plurality of types or a plurality of processing levels. In addition, a priority of a sensor may be further configured based on a vehicle function that needs to be implemented by the system, thereby implementing more stable and reliable vehicle control and ensuring safe driving while satisfying a delay requirement.

20 Claims, 4 Drawing Sheets

(56)     References Cited

U.S. PATENT DOCUMENTS

| | | | | |
|---|---|---|---|---|
| 11,640,177 | B2 * | 5/2023 | Barnes | G05D 1/0285 |
| | | | | 701/117 |
| 2006/0015231 | A1 * | 1/2006 | Yoshimura | B60L 3/0076 |
| | | | | 701/1 |
| 2018/0067492 | A1 * | 3/2018 | Oder | G01S 13/865 |
| 2019/0235500 | A1 * | 8/2019 | O'Brien | G05D 1/0088 |
| 2019/0243363 | A1 * | 8/2019 | Kim | B60W 50/023 |
| 2019/0315373 | A1 * | 10/2019 | Kondo | G07C 5/02 |
| 2019/0351899 | A1 | 11/2019 | Adam et al. | |
| 2019/0384522 | A1 | 12/2019 | Yun et al. | |
| 2020/0148202 | A1 * | 5/2020 | Staudacher | B60W 60/0015 |
| 2020/0166633 | A1 * | 5/2020 | Mayer | G01S 13/878 |
| 2020/0331493 | A1 * | 10/2020 | Wu | G06F 11/2038 |
| 2021/0122386 | A1 * | 4/2021 | Lee | G01S 17/931 |
| 2021/0124037 | A1 * | 4/2021 | Roh | G01S 13/931 |
| 2021/0234617 | A1 * | 7/2021 | Saito | H01S 5/0014 |
| 2021/0390848 | A1 * | 12/2021 | Ogawa | G08G 1/0112 |
| 2022/0089187 | A1 * | 3/2022 | Lefevre | B60W 60/0015 |
| 2024/0071095 | A1 * | 2/2024 | Iizuka | G01S 13/867 |
| 2024/0400088 | A1 * | 12/2024 | Hanasoge Shankaranarayana | |
| | | | Rao | G06V 10/764 |

OTHER PUBLICATIONS

Nagy Istvan, Hierarchical Mapping of an Electric Vehicle Sensor and Control Network, Jan. 2021, Research Gate, pp. 1-21 (pdf).*

* cited by examiner

100

VEHICLE SENSOR DATA PROCESSING METHOD AND SYSTEM

CROSS-REFERENCE TO RELATED APPLICATIONS

This application is a continuation of International Application No. PCT/CN2021/090244, filed on Apr. 27, 2021, which claims priority to Chinese Patent Application No. 202010450031.2, filed on May 25, 2020. The disclosures of the aforementioned applications are hereby incorporated by reference in their entireties.

TECHNICAL FIELD

Embodiments of this application relate to the field of data processing, and specifically, to a vehicle sensor data processing method and system.

BACKGROUND

Rapid development of artificial intelligence brings deep influence to the intelligent automobile industry. An intelligent vehicle can sense an ambient environment of the vehicle by using a plurality of external environment sensors disposed on the intelligent vehicle, to analyze safe and dangerous states of driving of the vehicle, control the vehicle to arrive at a destination based on a driver's intention, and finally achieve an objective of performing an autonomous driving operation on behalf of a person. Currently and in the near future, external environment sensors disposed on vehicles mainly have three types: image sensors, millimeter-wave radar sensors, and laser radar sensors. Other auxiliary sensors may also be used, including ultrasonic radar sensors, inertial measurement units (IMU), and the like. Currently, intelligent vehicle functions such as adaptive cruise control, assisted parking, lane centering control, and automatic emergency braking are implemented mainly depending on sensing of sensors. This results in different quantities and types of sensors. In addition, how to transmit and use sensor data needs to be considered to implement more stable and reliable sensing and control and ensure safe driving. For example, in an automatic emergency control function, if one of the sensors notifies that driving can be continued, but another sensor requires the intelligent vehicle to perform braking control, these possibly contradictory sensing results may cause the intelligent vehicle to perform wrong behavior, and an accident may happen.

SUMMARY

This application provides a vehicle sensor data processing method and system, to implement more stable and reliable vehicle control and ensure safe driving.

According to a first aspect, a vehicle sensor data processing system is provided. This system includes a plurality of levels of control units and at least two sensors, the plurality of levels of control units include one first control unit and at least one second control unit, and the first control unit is an upper-level control unit of the second control unit.

The method includes: The second control unit is configured to receive first data, and output second data to the first control unit, where the first data is from a sensor connected to the second control unit or is from a third control unit, and the third control unit is a lower-level control unit of the second control unit; and the first control unit is configured to output first control information to an external device based on second data from one or more second control units, where the first control information is used to control the external device.

According to this solution of this application, different levels of processing and fusion are performed on sensor data by using the plurality of levels of control units, to improve accuracy of a control decision, and improve driving safety of a vehicle.

With reference to the first aspect, in some implementations of the first aspect, the second control unit determines to process the first data when a data processing mode is set to a multi-level processing mode, where the second data is data obtained by processing the first data; or the second control unit determines to forward the first data when a data processing mode is set to a non-multi-level processing mode, where the second data is the first data.

According to this solution of this application, corresponding processing is performed on data based on a set data processing mode, and received data is output after being forwarded or processed, to improve accuracy of a control decision, and improve driving safety of a vehicle.

With reference to the first aspect, in some implementations of the first aspect, the second control unit outputs the second data when the sensor that sends the first data is a sensor with a first priority; or the second control unit outputs second control information to the external device when the sensor that sends the first data is a sensor with a second priority, where the second control information is used to control the external device.

According to this solution of this application, multi-level data processing is performed based on ensuring a sensor data processing delay, and data of a plurality of sensors is integrated, to implement more stable and reliable vehicle control and ensure safe driving.

With reference to the first aspect, in some implementations of the first aspect, the second control unit determines a priority of the sensor based on configuration information of the sensor, where the configuration information of the sensor is used to indicate the priority of the sensor; or the second control unit determines the priority of the sensor based on a delay requirement of the sensor and a first threshold, where the sensor is a sensor with the first priority when the delay requirement of the sensor is greater than or equal to the first threshold, or the sensor is a sensor with the second priority when the delay requirement of the sensor is less than or equal to the first threshold.

With reference to the first aspect, in some implementations of the first aspect, the first control unit is specifically configured to output the first control information to the external device based on the second data from the one or more second control units and data from the one or more first sensors, where the first sensor is a sensor connected to the first control unit.

According to this solution of this application, the sensor may connect to the first control unit, and the first control unit fuses data of the lower-level connected second control unit or a sensor to make a control decision, to implement more stable and reliable vehicle control and ensure safe driving.

With reference to the first aspect, in some implementations of the first aspect, the third control unit is configured to receive data from a fourth control unit or data from a second sensor, the second sensor is connected to the third control unit, and the fourth control unit is a lower-level control unit of the third control unit.

According to this solution of this application, this data processing system includes the plurality of levels of control units, and different levels of processing and fusion are performed on sensor data by using the plurality of levels of control units, to improve accuracy of a control decision, and improve driving safety of a vehicle.

According to a second aspect, a vehicle sensor data processing method is provided. The method is performed by a first control unit in a vehicle sensor data processing system. The vehicle sensor data processing system includes a plurality of levels of control units and at least two sensors. The plurality of levels of control units include at least one first control unit and at least one second control unit. The first control unit is an upper-level control unit of the second control unit.

The method includes: The first control unit determines first control information based on one or more pieces of second data, where the one or more pieces of second data are from one or more second control units connected to the first control unit, and the first control information is used to control an external device; and the first control unit outputs the first control information to the external device.

With reference to the second aspect, in some implementations of the second aspect, that the first control unit determines first control information based on one or more pieces of second data includes: The first control unit determines the first control information based on the one or more pieces of second data and data from one or more first sensors, where the first sensor is a sensor connected to the first control unit.

According to a third aspect, a vehicle sensor data processing method is provided. The method is performed by a second control unit in a vehicle sensor data processing system. The vehicle sensor data processing system includes a plurality of levels of control units and at least two sensors. The plurality of levels of control units include at least one first control unit and at least one second control unit. The first control unit is an upper-level control unit of the second control unit.

The method includes: The second control unit receives one or more pieces of first data, where the one or more pieces of first data are from one or more sensors connected to the second control unit, or the one or more pieces of first data are from a third control unit, and the third control unit is a lower-level control unit of the second control unit; and the second control unit outputs second data to the first control unit, where the first control unit is an upper-level control unit of the second control unit.

With reference to the third aspect, in some implementations of the third aspect, the second control unit determines to process the first data when a data processing mode is set to a multi-level processing mode, where the second data is data obtained by processing the first data; or the second control unit determines to forward the first data when a data processing mode is set to a non-multi-level processing mode, where the second data is the first data.

With reference to the third aspect, in some implementations of the third aspect, the second control unit outputs the second data when the sensor that sends the first data is a sensor of a first priority; or the second control unit outputs second control information to an external device when the sensor that sends the first data is a sensor with a second priority, where the second control information is used to control the external device.

With reference to the third aspect, in some implementations of the third aspect, the second control unit determines a priority of the sensor based on configuration information of the sensor, where the configuration information of the sensor is used to indicate the priority of the sensor; or the second control unit determines a priority of the sensor based on a delay requirement of the sensor and a first threshold, where the sensor is a sensor with the first priority when the delay requirement of the sensor is greater than or equal to the first threshold, or the sensor is a sensor with the second priority when the delay requirement of the sensor is less than or equal to the first threshold.

According to a fourth aspect, a vehicle sensor data processing apparatus is provided, including a processor. The processor is coupled to a memory, and may be configured to execute instructions in the memory, to implement the method according to any one of the second aspect or the third aspect and the possible implementations of the second aspect or the third aspect. Optionally, the vehicle sensor data processing apparatus further includes a memory. Optionally, the vehicle sensor data processing apparatus further includes a communications interface, and the processor is coupled to the communications interface. The communications interface may be an input/output interface.

Optionally, the input/output interface may be an input/output circuit.

According to a fifth aspect, a processor is provided, including an input circuit, an output circuit, and a processing circuit. The processing circuit is configured to: receive a signal through the input circuit, and transmit a signal through the output circuit, so that the processor performs the method according to any one of the second aspect or the third aspect and the possible implementations of the second aspect or the third aspect.

In a specific implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver. A signal output by the output circuit may be output to, for example, but not limited to, a transmitter and transmitted by the transmitter. The input circuit and the output circuit may be a same circuit, where the circuit is used as the input circuit and the output circuit at different moments. Specific implementations of the processor and the various circuits are not limited in embodiments of this application.

According to a sixth aspect, a processing apparatus is provided, including a processor and a memory. The processor is configured to: read instructions stored in the memory, input data or information by using an input interface, and output data or information by using an output interface, to perform the method according to any one of the second aspect or the third aspect and the possible implementations of the second aspect or the third aspect.

Optionally, there may be one or more processors, and there may be one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be separately disposed on different chips. A type of the memory and a manner in which the memory and the processor are disposed are not limited in embodiments of this application.

The processing apparatus in the sixth aspect may be one or more chips. The processor in the processing apparatus may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a seventh aspect, a computer program product is provided. The computer program product includes a computer program (also referred to as code or instructions). When the computer program is run, a computer is enabled to perform the method according to any one of the second aspect or the third aspect and the possible implementations of the second aspect or the third aspect.

According to an eighth aspect, a computer-readable storage medium is provided. The computer-readable storage medium stores a computer program (which may also be referred to as code or instructions). When the computer program is run on a computer, the computer is enabled to perform the method according to any one of the second aspect or the third aspect and the possible implementations of the second aspect or the third aspect.

DESCRIPTION OF EMBODIMENTS

The following describes the technical solutions of this application with reference to the accompanying drawings.

The technical solutions in embodiments of this application may be applied to an autonomous driving scenario, for example, may be applied to various vehicles. With continuous development of autonomous driving technologies, cruise control, light control, airbag control, and the like all require a sensor to sense a change of an environment in which a vehicle is located, to provide data used for control decision-making to a control unit. As a quantity of sensors increases for implementation of various functions, how to process sensed data from a large quantity of sensors to make a timely and accurate control decision is a hot issue of ensuring safe driving. This application provides a method of fusing data from a plurality of sensors by using an architecture with a plurality of levels of control units to make a control decision. On the basis of guaranteeing a sensor data processing delay, this method can fuse data sensed by a plurality of sensors, to improve vehicle control reliability, and further improve vehicle driving safety.

A vehicle sensor data processing system according to this application includes a plurality of levels of control units and at least two sensors. The plurality of levels of control units include at least two levels of control units, for example, may include two levels of control units, or may include three levels of control units, four levels of control units, or five levels of control units. A specific quantity of levels of control units is not limited in this application. Any variation or replacement readily figured out by a person skilled in the art within the technical scope disclosed in this application shall fall within the protection scope of this application.

Figure 1:
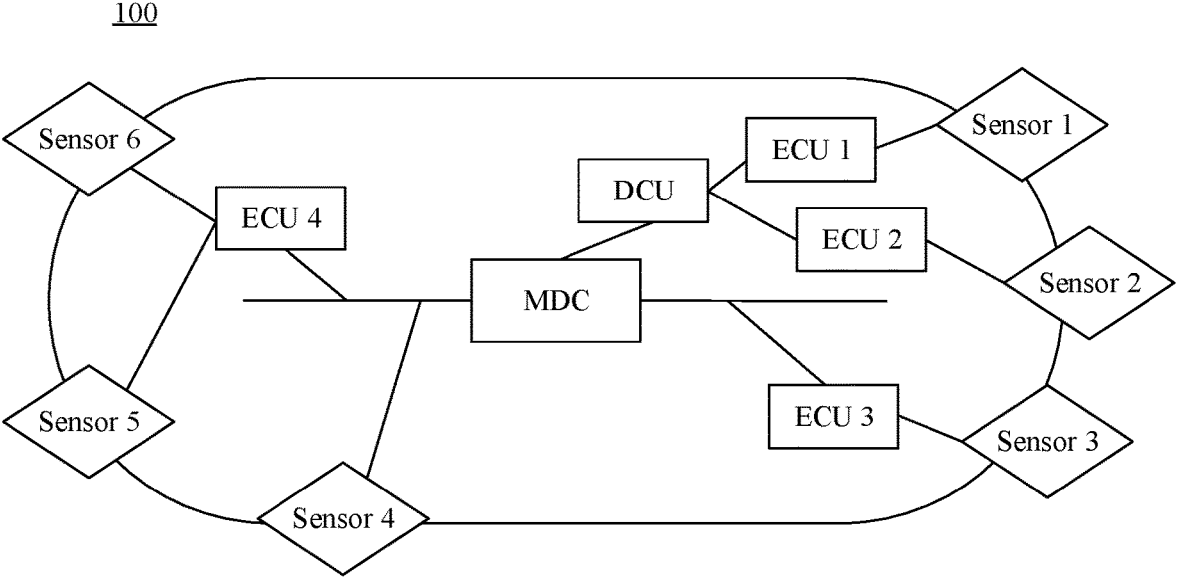
FIG. 1 is a schematic diagram of a vehicle sensor data processing system applicable to an embodiment of this application.

FIG. 1 is a schematic diagram of a vehicle sensor data processing system applicable to an embodiment of this application.

It should be noted that, to clearly describe the solutions of this application, an example in which three levels of control units are included in FIG. 1 is used for description. FIG. 1 is merely a schematic diagram of a structure of a system in this application, but this is not limited in this application. As shown in FIG. 1, the vehicle sensor data processing system 100 may include at least one multi-domain controller (multiple domain controller, MDC) and at least one electronic control unit (ECU), for example, an ECU 1 to an ECU 4 in FIG. 1, where each ECU is connected to at least one sensor. The vehicle sensor data processing system 100 may further include at least one domain control unit (DCU). The DCU may be an upper-level control unit of the ECU and a lower-level control unit of the MDC, and may fuse data from the lower-level ECU, and output control information, or transmit processed data to the MDC. The multi-domain controller may be a first control unit, and is directly connected to at least one second control unit (for example, an ECU or a DCU) and/or a sensor. In an implementation, if the vehicle sensor data processing system 100 includes two levels of control units, the second control unit is an ECU. In another implementation, if the vehicle sensor data processing system 100 includes three levels of control units, the second control unit may be a DCU or an ECU. The ECU connected to the DCU may be a third control unit, and the MDC may further be connected to at least one third control unit. The MDC may fuse data from the connected second control unit and/or sensor, and output control information to control an external device.

The following describes in detail embodiments provided in this application with reference to the accompanying drawings.

Figure 2:
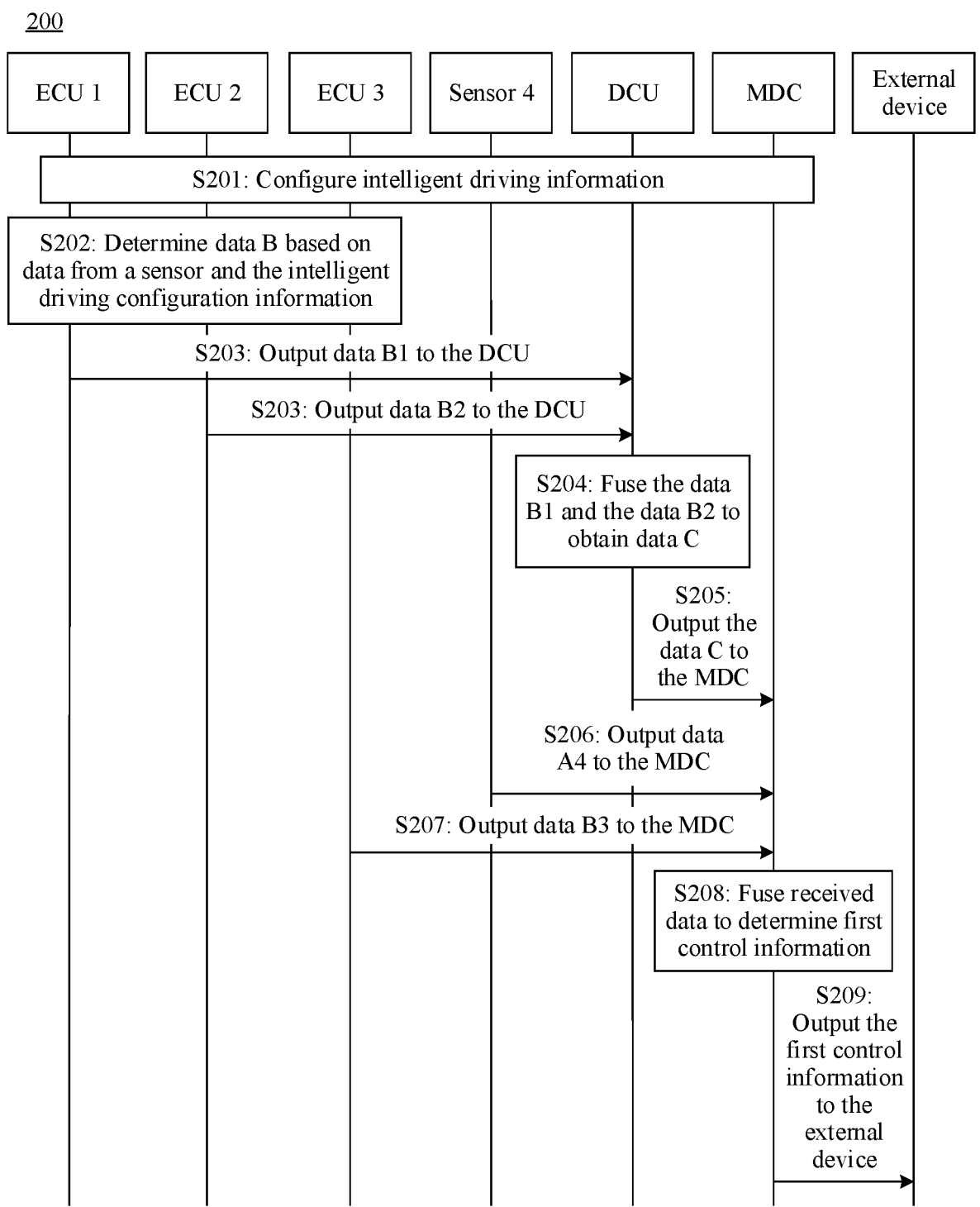
FIG. 2 is a schematic flowchart of an example of a vehicle sensor data processing method according to an embodiment of this application.

FIG. 2 is a schematic flowchart of an example of a vehicle sensor data processing method according to an embodiment of this application.

Each control unit included in FIG. 2 corresponds to each control unit in the vehicle sensor data processing system 100 in FIG. 1. For a connection manner thereof, refer to FIG. 1. FIG. 2 may be a schematic flowchart of a vehicle sensor processing method for controlling a first vehicle function of a vehicle. For example, the first vehicle function may be cruising, route planning, or braking.

S201: Configure intelligent driving information.

The intelligent driving configuration information may be configured by a driver or another associated function. For example, the driver configures the intelligent driving information when enabling an autonomous driving function. For another example, autonomous driving information is configured due to a change of an engine control function. However, this is not limited in this application.

Optionally, the intelligent driving information may include data processing mode setting information.

For example, the data processing mode configuration information may set a data processing mode to a multi-level processing mode or a non-multi-level processing mode. The multi-level processing mode may be a data processing mode in which data from a plurality of sensors is processed and fused by a plurality of levels of control units and then a control decision is output according to this application.

Optionally, the intelligent driving information may be used to configure the first vehicle function. The system may predefine that the first vehicle function corresponds to one data processing mode. For example, if the first vehicle function corresponds to the multi-level processing mode, the control unit may determine, based on the first vehicle function, that the processing mode is the multi-level processing mode.

S202: An ECU receives data A (that is, an example of first data) from a connected sensor.

An ECU 1, an ECU 2, and an ECU 3 separately receive data sensed by sensors connected to the ECU 1, the ECU 2, and the ECU 3. For example, the ECU 1 receives data A1 sensed by a sensor 1, the ECU 2 receives data A2 sensed by a sensor 2, and the ECU 3 receives data A3 sensed by a sensor 3.

S202: The ECU determines data B based on the data from the sensor and the data processing mode setting information.

In an implementation, the ECU determines, based on the intelligent driving information, that the data processing mode is set to the multi-level processing mode. The multi-level processing mode is applicable to each ECU related to the first vehicle function. In this case, each ECU processes data received from a sensor, to obtain data B.

For example, the ECU 1, the ECU 2, and the ECU 3 determine, based on the intelligent driving information, that the data processing mode is the multi-level processing mode. In this case, the ECU 1 processes the data A1 from the sensor 1 to obtain data B1, the ECU 2 processes the data A2 from the sensor 2 to obtain data B2, and the ECU 3 processes the data A3 from the sensor 3 to obtain data B3.

In another implementation, the ECU determines, based on the intelligent driving information, that the data processing mode is set to the non-multi-level processing mode, and the ECU does not process the data A received from the sensor, but forwards the data A from the sensor to an upper-level control unit. That is, the data B is the data A. In other words, the ECU does not process the data A from the sensor and forwards the data A to the upper-level control unit for processing by the upper-level control unit.

For example, if the first vehicle function is a function requiring fusion of high-precision data from a plurality of sensors to make a control decision, the ECU transmits raw data from the sensors to the upper-level control unit, and the upper-level control unit makes a control decision after fusing the data from the plurality of sensors. However, this is not limited in this application.

In another implementation, the ECU determines, based on the intelligent driving information, that the data processing mode is set to the non-multi-level processing mode. The ECU processes the data A from the sensor, and determines control information B (that is, an example of second control information), where the control information B is used to control an external device.

For example, the first vehicle function is a function with a high emergency degree, for example, an anti-collision function. After receiving data from a sensor, the ECU processes the data from the sensor, and makes a control decision. However, this is not limited in this application.

In another implementation, each sensor may correspond to one data processing mode. In other words, the intelligent driving information may include information for separately configuring a data processing mode for a plurality of sensors, and the ECU determines, based on a data processing mode of a corresponding sensor, whether to process data from the sensor.

For example, when the vehicle performs the first vehicle function, the control decision has different precision requirements on the sensor data. Therefore, corresponding data processing modes are configured for different sensors. The ECU determines, based on the data processing mode of the corresponding sensor, whether to process the data from the sensor. However, this is not limited in this application.

S203: The ECU 1 and the ECU 2 separately output the data B1 and the data B2 to a DCU.

It should be noted that S203 is an optional step. When the system includes more than three levels of control units, S203 may be performed. During specific implementation, the structure may be two levels of control units, and the two levels of control units do not include a DCU. Therefore, S203 is not performed.

S204: The DCU fuses the data B1 and the data B2 to obtain data C (that is, an example of second data).

The DCU fuses the data B1 and the data B2 to obtain the data C, where the data C includes data obtained after the DCU fuses the data B1 and the data B2. The data C may further include decision information determined by the DCU based on the data B1 and the data B2, and the decision information may be used as a decision reference by an upper-level control unit.

For example, after data from two sensors with similar sensing tasks is processed by the ECU, the DCU may perform data fusion to obtain fused data or preliminary decision information for the sensing task. For example, the sensing task may be obstacle sensing, and the sensor 1 and the sensor 2 are configured to sense an obstacle. After data from the two sensors is separately processed by the ECU 1 and the ECU 2, the DCU fuses the data to obtain the data C, and the data C includes obstacle-related fusion information and a preliminary decision made by the DCU. Then the data C is transmitted to an MDC in S205 for reference by the MDC during decision-making.

S205: The DCU outputs the data C to the MDC.

S206: A sensor 4 outputs data A4 to the MDC.

The sensor can be directly connected to the MDC to provide accurate sensing data for the MDC.

S207: The ECU 3 outputs the data B3 to the MDC.

The MDC may further be connected to a control unit (for example, the ECU 3) that is connected to a sensor, and the ECU 3 may output the data B2 to the MDC.

S208: The MDC fuses received data to determine first control information.

The MDC receives data obtained after data from the plurality of sensors undergoes processing of different levels, fuses the received data of different levels or different types, and determines the first control information, that is, a control decision made by the MDC. Then the MDC outputs the first control information to an external device in S209, where the first control information is used to control the external device.

For example, the first vehicle function is a function of automatic reversing into parking space, and precision of processing levels of data from sensors at various locations that is required by the MDC to finally make a decision to continue reversing is different. Therefore, after receiving data of different processing levels, the MDC performs data fusion, and makes a decision to continue reversing. The external device may be a rotating shaft of vehicle tires, and the first control information controls the rotating shaft of the vehicle tires to continue rotating.

According to the solution of this application, different levels of processing and fusion are performed on sensor data by using the plurality of levels of control units, to improve accuracy of a control decision, and improve driving safety of a vehicle.

Figure 3A:
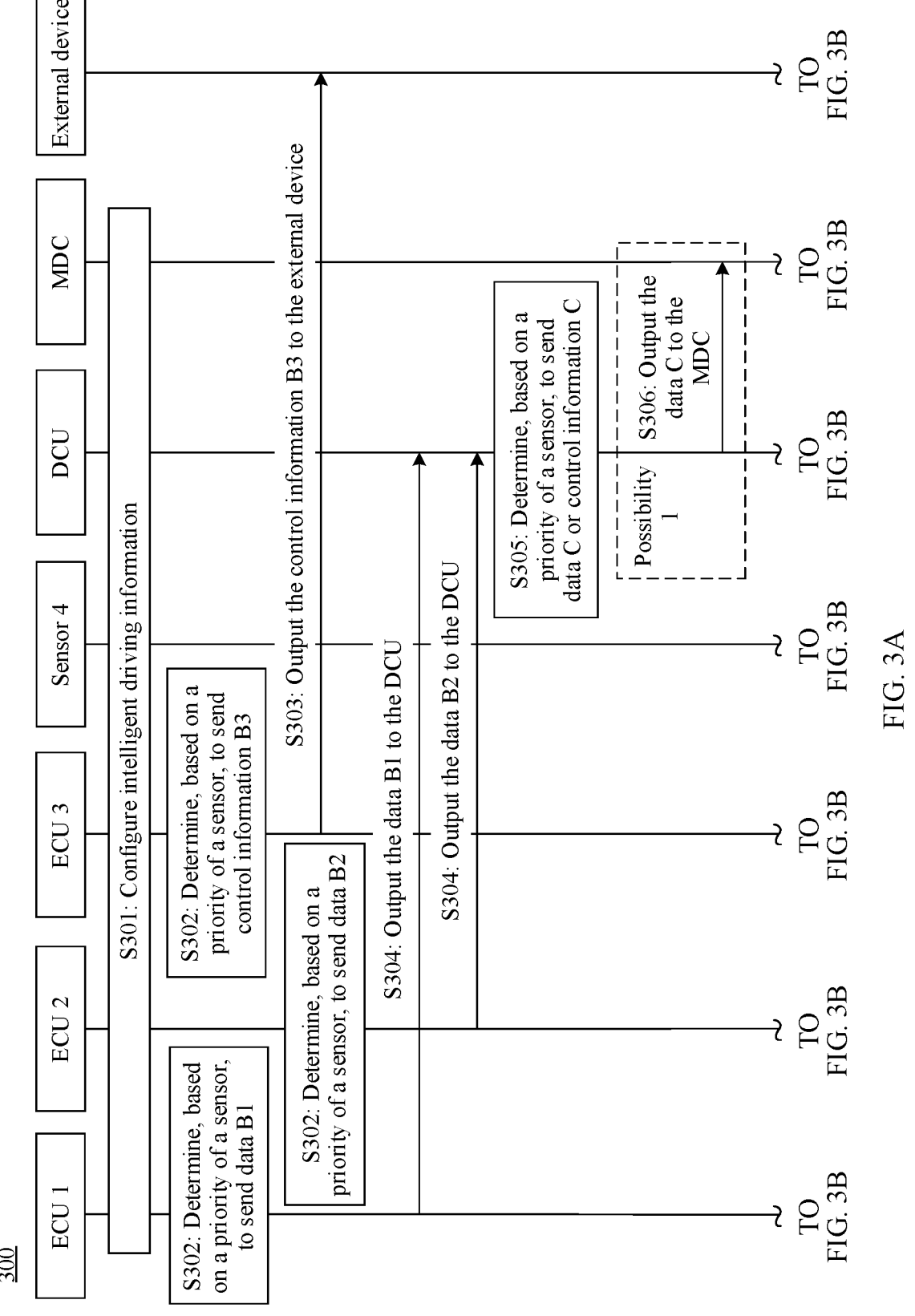
FIG. 3A and FIG. 3B are a schematic flowchart of an example of a vehicle sensor data processing method according to an embodiment of this application.
Figure 3B:
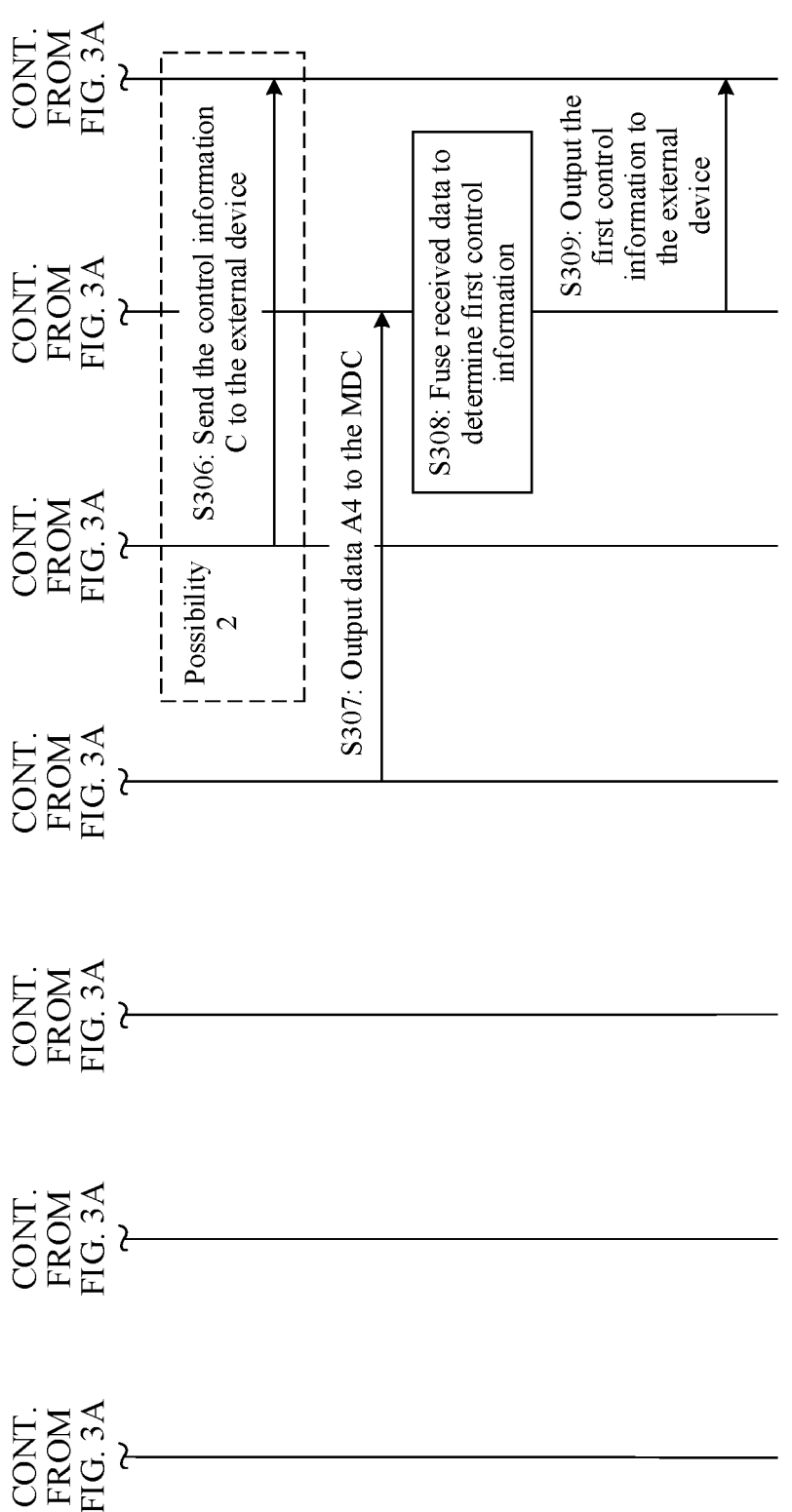

FIG. 3A and FIG. 3B are a schematic flowchart of an example of a vehicle sensor data processing method according to an embodiment of this application.

Each control unit included in FIG. 3A and FIG. 3B corresponds to each control unit in the vehicle sensor data processing system 100 in FIG. 1. For a connection manner thereof, refer to FIG. 1. FIG. 3A and FIG. 3B may be a schematic flowchart of a vehicle sensor data processing method for controlling a first vehicle function of a vehicle. For example, the first vehicle function may be cruising, route planning, or braking.

S301: Configure intelligent driving information.

The intelligent driving configuration information may include configuration information of a sensor, and the configuration information of the sensor may be used to configure a priority of each sensor when the first vehicle function is performed.

In an implementation, the configuration information of the sensor directly indicates the priority of the sensor.

Optionally, the configuration information of the sensor indicates that a priority of the sensor is a priority A (that is, an example of a first priority) or a priority B (that is, an example of a second priority). After receiving the data from the sensor with the priority A, an ECU processes the data from the sensor and outputs obtained data B. After receiving the data from the sensor with the priority B, the ECU makes a control decision based on the data from the sensor. That is, the ECU processes the data from the sensor and outputs control information B (that is, an example of second control information), where the control information B is used to control an external device.

Optionally, the priority that is of the sensor and that is indicated by the configuration information of the sensor includes three levels, for example, priority A, priority A, and priority C.

The priority A (that is, an example of the first priority) indicates that the data from the sensor is processed by an MCU to make a control decision.

For example, if an ECU 1 determines, based on the configuration information, that a priority of a sensor 1 is the priority A, the ECU 1 receives data from the sensor 1, processes the data, and outputs data B1 to a DCU. Similarly, if an ECU 2 determines that a priority of a sensor 2 is the priority A, the ECU 2 receives data from the sensor 2, processes the data, and outputs data B2 to the DCU. The DCU receives the data B1 and the data B2. In S305, priorities of sensors are determined. The priorities of the two sensors are determined as A. The received data is fused and data C is output to the MCU, and the MCU makes a control decision based on the data from the two sensors.

The priority B (that is, an example of the second control information) indicates that the data from the sensor is processed by the ECU to make a control decision.

The priority C (that is, another example of the first priority) indicates that the data from the sensor is processed by the DCU to make a control decision. That is, data from sensors with the priority A and the priority C needs to be fused with other data, and then the MCU or the DCU makes the control decision.

For example, if the priorities of the sensor 1 and the sensor 2 are the priority C, after the DCU receives the data B1 and the data B2 that are obtained through processing by the ECU 1 and the ECU 2, the DCU fuses the data and makes a control decision in S305, and outputs the control decision, that is, control information C, to an external device in S306.

In another implementation, the intelligent driving configuration information includes configuration information of a processing delay requirement of sensor data and configuration information of a processing delay threshold of a control unit (an ECU and/or a DCU).

The ECU and/or the DCU determine/determines a priority of the sensor based on the delay requirement of the sensor data and the threshold. When the delay requirement of the sensor is greater than or equal to the threshold, the sensor is a sensor with the first priority, that is, the first priority indicates that the control unit processes the data from the sensor and then outputs the obtained data (data B or data C). Alternatively, when the delay requirement of the sensor is less than or equal to the threshold, the sensor is a sensor with the second priority, that is, the second priority indicates that the control unit makes a control decision based on the data from the sensor, and outputs control information to an external device. In specific implementation, when the delay requirement is equal to the threshold, the sensor may be determined as a sensor with the first priority or a sensor with the second priority. This is not limited in this application.

According to the foregoing solution, on a basis of ensuring the processing delay requirement of the sensor data, different levels of processing and fusion are performed on the sensor data by using the plurality of levels of control units, to improve accuracy of a control decision, and improve driving safety of a vehicle.

S302: An ECU determines, based on a priority of a sensor, to send the data B or the control information B.

After each ECU determines, based on the intelligent driving configuration information, a priority of a sensor connected to the ECU, the ECU determines, based on the priority of the sensor, to send the data B or the control information B.

For example, if sensors connected to the ECU 1 and the ECU 2 are sensors with the first priority, for example, the sensor 1 and the sensor 2 are sensors with the priority A, or delay requirements of the sensor 1 and the sensor 2 are greater than or equal to the threshold, the ECU 1 and the ECU 2 process data from the sensors and obtain the data B1 and the data B2, and then output the data B1 and the data B2 to the DCU in S304.

For another example, if the sensor 3 connected to the ECU 3 is a sensor with the second priority, for example, the sensor 3 is a sensor with the priority C, or a delay requirement of the sensor 3 is greater than or equal to the threshold, the ECU 3 makes a control decision based on the data from the sensor, and outputs control information B3 to an external device in S303.

S305: The DCU determines, based on the priority of the sensor, to send the data C or the control information C.

The DCU determines a priority of a lower-level sensor of the DCU based on the intelligent driving configuration information, to determine to send the data C or the control information C after receiving sensor data that is processed and output by the ECU or after receiving data from the sensor.

For example, if the DCU determines that the priorities of the lower-level sensor 1 and the lower-level sensor 2 are the first priority, after receiving the data B1 and the data B2, the DCU processes the data and obtains the data C, where data C may include data obtained after the data B1 and the data B2 are fused and/or decision information of the DCU for reference by the MCU. In S306, the DCU outputs the data C to the MDC.

For another example, the DCU is further connected to a sensor 7 (not shown in the figure), and the sensor 7 is a sensor with the second priority. For example, if a delay requirement of the sensor is less than or equal to the threshold, the DCU makes a control decision based on data from the sensor to obtain control information C, and sends the control information C to an external device in S306, where the control information is used to control the external device.

S307: The sensor 4 outputs data A4 to the MDC.

S308: The MDC fuses the received data to determine first control information.

S309: The MDC outputs the first control information to an external device.

S307, S308, and S309 are respectively the same as or similar to S207, S208, and S209 in FIG. 2. For specific implementations, refer to the foregoing descriptions of S207, S208, and S209 in FIG. 2. For brevity, details are not described again.

According to the foregoing solution, on a basis of ensuring the processing delay requirement of the sensor data, different levels of processing and fusion are performed on the sensor data by using the plurality of levels of control units, to improve accuracy of vehicle control, and improve driving safety of a vehicle.

The methods provided in embodiments of this application are described above in detail with reference to FIG. 2 and FIG. 3A and FIG. 3B. The following describes in detail a vehicle sensor data processing system according to an embodiment of this application.

The vehicle sensor data processing system includes a plurality of levels of control units and at least two sensors, where the plurality of levels of control units include a first control unit and at least one second control unit, and the first control unit is an upper-level control unit of the second control unit.

The second control unit is configured to receive first data, and output second data to the first control unit, where the first data is from a sensor connected to the second control unit or is from a third control unit. The first control unit is configured to output first control information to an external device based on the second data from the one or more second control units, where the first control information is used to control the external device.

For example, the first control unit is an MCU. When the vehicle sensor data processing system includes three levels of control units, the second control unit may be a DCU or an ECU, and the third control unit may be an ECU connected to a DCU. When the vehicle sensor data processing system includes two levels of control units, the second control unit may be an ECU.

Optionally, when a data processing mode is set to a multi-level processing mode, the second control unit determines to process the first data, where the second data is data obtained by processing the first data. Alternatively, when the data processing mode is set to a non-multi-level processing mode, the second control unit determines to forward the first data, where the second data is the first data.

For the data processing mode, refer to the description of the data processing mode in FIG. 2. For brevity, details are not described again.

Optionally, when a sensor that sends the first data is a sensor of a first priority, the second control unit outputs the second data. Alternatively, when the sensor that sends the first data is a sensor of a second priority, the second control unit outputs second control information to an external device, where the second control information is used to control the external device.

The second control unit may determine the priority of the sensor based on configuration information of the sensor, where the configuration information of the sensor is used to indicate the priority of the sensor. Alternatively, the second control unit may determine the priority of the sensor based on a delay requirement of the sensor and a first threshold, where the sensor is a sensor of the first priority when the delay requirement of the sensor is greater than or equal to the first threshold, or the sensor is a sensor of the second priority when the delay requirement of the sensor is less than or equal to the first threshold.

For a specific implementation of the priority of the sensor, refer to the priority of the sensor in FIG. 3A and FIG. 3B. For brevity, details are not described again.

Optionally, the first control unit is specifically configured to output the first control information to the external device based on the second data from the one or more second control units and data from the one or more first sensors, where the first sensor is a sensor connected to the first control unit.

Optionally, the third control unit is configured to receive data from a fourth control unit or data from a second sensor, the second sensor connects to the third control unit, and the fourth control unit is a lower-level control unit of the third control unit.

This application provides a vehicle sensor data processing apparatus. The vehicle sensor data processing apparatus may include units configured to perform the method 200 in FIG. 2 and the method 300 in FIG. 3A and FIG. 3B.

This application further provides a vehicle sensor data processing apparatus, including at least one processor. The at least one processor is coupled to a memory, and may be configured to perform the method 200 in FIG. 2 and the method 300 in FIG. 3A and FIG. 3B. Optionally, a communications apparatus further includes a memory. Optionally, the vehicle sensor data processing apparatus further includes a communications interface, and the processor is coupled to the communications interface. The communications interface may be an input/output interface. The input/output interface may be an input/output circuit.

This application further provides a processor, including an input circuit, an output circuit, and a processing circuit. The processing circuit is configured to receive a signal by using the input circuit, and transmit a signal by using the output circuit, so that the processor can be configured to perform the method 200 in FIG. 2 and the method 300 in FIG. 3A and FIG. 3B.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver. A signal output by the output circuit may be output to, for example, but not limited to, a transmitter and transmitted by the transmitter. The input circuit and the output circuit may be a same circuit, where the circuit is used as the input circuit and the output circuit at different moments. Specific implementations of the processor and the circuits are not limited in embodiments of this application.

It should be understood that a related data exchange process, for example, sending data or information may be a process of outputting data or information from the processor, and receiving data or information may be a process of receiving input data or information by the processor. Specifically, data output by the processor may be output to the transmitter, and input data received by the processor may be from the receiver. The transmitter and the receiver may be collectively referred to as a transceiver.

The processor may be a chip. The processor may be implemented by using hardware, or may be implemented by using software. When implemented by using the hardware, the processor may be a logic circuit, an integrated circuit, or the like. When implemented by using the software, the processor may be a general-purpose processor, and is implemented by reading software code stored in a memory. The memory may be integrated into the processor, or may be located outside the processor and exist independently.

This application further provides a computer program product. The computer program product includes a computer program (which may also be referred to as code or instructions). When the computer program is run, a computer is enabled to perform the method 200 in FIG. 2 and the method 300 in FIG. 3A and FIG. 3B.

This application further provides a computer-readable medium. The computer-readable medium stores a computer program (which may also be referred to as code or instructions). When the computer program is run on a computer, the computer is enabled to perform the method 200 in FIG. 2 and the method 300 in FIG. 3A and FIG. 3B.

An embodiment of this application further provides a processing apparatus, including a processor and an interface. The processor is configured to perform the method in any one of the foregoing method embodiments.

It should be understood that the processing apparatus may be one or more chips. For example, the processing apparatus may be a field programmable gate array (FPGA), an application-specific integrated circuit (ASIC), a system on chip (SoC), a central processing unit (central processor unit, CPU), a network processor (NP), a digital signal processor (DSP), a micro controller unit (MCU), a programmable logic device (PLD), or another integrated chip.

In an implementation process, steps in the foregoing methods may be completed by using an integrated logic circuit of hardware in the processor or by using instructions in a form of software. Steps of the methods disclosed with reference to embodiments of this application may be directly executed and accomplished by a hardware processor, or may be executed and accomplished by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps of the foregoing method in combination with hardware of the processor. To avoid repetition, details are not described herein again.

It should be noted that, the processor in embodiments of this application may be an integrated circuit chip, and has a signal processing capability. In an implementation process, steps in the foregoing method embodiments may be completed by using an integrated logic circuit of hardware in the processor or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or execute the methods, steps, and logical block diagrams disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps of the foregoing method in combination with hardware of the processor.

It may be understood that the memory in embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that, the memory of the systems and methods described in this specification includes but is not limited to these and any other memories of appropriate types.

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer instructions are loaded and executed on the computer, all or some of the procedures or functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid-state drive (solid-state disc, SSD)), or the like.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units. To be specific, the components may be located at one position, or may be distributed on a plurality of network units. Some or all of the units may be selected according to actual requirements to achieve the objectives of the solutions in embodiments.

In addition, functional units in embodiments of this application may be integrated into one processing unit, or each of the units may exist alone physically, or two or more units may be integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A vehicle sensor data processing system, wherein the system comprises a plurality of sensors and a plurality of electric controllers with different levels, the plurality of electric controllers comprise one first electric controller and at least one second electric controller, and the first electric controller is an upper-level electric controller of the at least one second electric controller;

the at least one second electric controller is configured to receive first data, and output second data to the first electric controller, wherein the first data is from a sensor connected to the at least one second electric controller or is from a third electric controller of the plurality of electric controllers, and the third electric controller is a lower-level electric controller of the at least one second electric controller, wherein the sensor is among the plurality of sensors, wherein different data processing modes are correspondingly configured for different sensors individually among the plurality of sensors, and the at least one second electric controller is configured to determine, based on a data processing mode of a corresponding sensor, whether to process data from the corresponding sensor;

wherein the at least one second electric controller is further configured to determine a priority of the sensor based on a delay requirement of the sensor and a first threshold, wherein based on the delay requirement of the sensor being greater than or equal to the first threshold, the at least one second electric controller is configured to determine that the sensor is with a first priority, and wherein based on the delay requirement of the sensor being less than or equal to the first threshold, the at least one second electric controller is configured to determine that the sensor is with a second priority; and the first electric controller is configured to output real-time first control information to a device based on the second data output from the at least one second electric controller, and the first control information is used to control the device.

2. The system according to claim 1, wherein the at least one second electric controller is further configured to process the first data based on a data processing mode being set to a multi-level processing mode, wherein the second data is data obtained by processing the first data.

3. The system according to claim 1, wherein the at least one second electric controller is configured to output the second data based on the sensor that sends the first data being a sensor with the first priority.

4. The system according to claim 3, wherein the at least one second electric controller is configured to determine a priority of the sensor based on configuration information of the sensor, wherein the configuration information of the sensor indicates the priority of the sensor.

5. The system according to claim 1, wherein the first electric controller is configured to output the first control information to the device based on the second data from the at least one second electric controller and data from one or more first sensors, and a first sensor is a sensor connected to the first electric controller.

6. The system according to claim 1, wherein the third electric controller is configured to receive data from a fourth electric controller or data from a second sensor, the second sensor is connected to the third electric controller, and the fourth electric controller is a lower-level electric controller of the third electric controller.

7. The system according to claim 1, wherein the at least one second electric controller is configured to forward the first data based on a data processing mode being set to a non-multi-level processing mode, wherein the second data is the first data.

8. The system according to claim 1, wherein the at least one second electric controller is configured to output second control information to the device based on the sensor that sends the first data being a sensor with the second priority, wherein the second control information is used to control the device.

9. The system according to claim 1, wherein the plurality of sensors include image sensors, millimeter-wave radar sensors, and/or laser radar sensors.

10. A vehicle sensor data processing method comprising:

receiving, by at least one second electric controller of a vehicle sensor data processing system comprising a plurality of sensors, one or more pieces of first data, wherein the one or more pieces of first data are from one or more sensors connected to the at least one second electric controller, wherein the one or more sensors are among the plurality of sensors, or the one or more pieces of first data are from a third electric controller of the vehicle sensor data processing system, and the third electric controller is a lower-level electric controller of the at least one second electric controller;

outputting, by the at least one second electric controller, second data to a first electric controller of the vehicle sensor data processing system, wherein the first electric controller is an upper-level electric controller of the at least one second electric controller;

wherein different data processing modes are correspondingly configured for different sensors individually among the plurality of sensors, and the at least one second electric controller is configured to determine, based on a data processing mode of a corresponding sensor, whether to process data from the corresponding sensor;

wherein the at least one second electric controller is further configured to determine a priority of a sensor based on a delay requirement of the sensor and a first threshold, wherein based on the delay requirement of the sensor being greater than or equal to the first threshold, the at least one second electric controller is configured to determine that the sensor is with a first priority, and wherein based on the delay requirement of the sensor being less than or equal to the first threshold, the at least one second electric controller is configured to determine that the sensor is with a second priority;

determining, by the first electric controller, real-time first control information based on the second data; and outputting, by the first electric controller, the first control information to a device.

11. The method according to claim 10, wherein the determining, by the first electric controller, the first control information based on the second data comprises:

determining, by the first electric controller, the first control information based on the second data and data from one or more first sensors, wherein a first sensor is a sensor connected to the first electric controller.

12. The method according to claim 10, further comprising:

processing, by the at least one second electric controller, the first data based on a data processing mode being set to a multi-level processing mode, wherein the second data is data obtained by processing the first data.

13. The method according to claim 10, further comprising:

forwarding, by the second electric controller, the first data based on a data processing mode being set to a non-multi-level processing mode, wherein the second data is the first data.

14. A vehicle comprising a vehicle sensor data processing system, wherein the system comprises a plurality of sensors and a plurality of levels of electric controllers, the plurality of levels of electric controllers comprise one first electric controller and at least one second electric controller, and the first electric controller is an upper-level electric controller of the at least one second electric controller;

the at least one second electric controller is configured to receive first data, and output second data to the first electric controller, the first data is from a sensor connected to the at least one second electric controller or is from a third electric controller, and the third electric controller is a lower-level electric controller of the at least one second electric controller, wherein the sensor is among the plurality of sensors; and wherein different data processing modes are correspondingly configured for different sensors individually among the plurality of sensors, and the at least one second electric controller is configured to determine, based on a data processing mode of a corresponding sensor, whether to process data from the corresponding sensor;

wherein the at least one second electric controller is further configured to determine a priority of the sensor based on a delay requirement of the sensor and a first threshold, wherein based on the delay requirement of the sensor being greater than or equal to the first threshold, the at least one second electric controller is configured to determine that the sensor is with a first priority, and wherein based on the delay requirement of the sensor being less than or equal to the first threshold, the at least one second electric controller is configured to determine that the sensor is with a second priority the first electric controller is configured to output real-time first control information to a device based on the second data output from the at least one second electric controller, and the first control information is used to control the device.

15. The vehicle according to claim 14, wherein the at least one second electric controller is configured to process the first data based on a data processing mode being set to a multi-level processing mode, wherein the second data is data obtained by processing the first data.

16. The vehicle according to claim 14, wherein the at least one second electric controller is configured to output the second data based on the sensor that sends the first data being a sensor with the first priority; or the at least one second electric controller is configured to output second control information to the device based on the sensor that sends the first data being a sensor with the second priority, wherein the second control information is used to control the device.

17. The vehicle according to claim 16, wherein the at least one second electric controller is configured to determine a priority of the sensor based on configuration information of the sensor, wherein the configuration information of the sensor indicates the priority of the sensor.

18. The vehicle according to claim 14, wherein the first electric controller is configured to output the first control information to the device based on the second data from the at least one second electric controller and data from one or more first sensors, and a first sensor is a sensor connected to the first electric controller.

19. The vehicle according to claim 14, wherein the third electric controller is configured to receive data from a fourth electric controller or data from a second sensor, the second sensor is connected to the third electric controller, and the fourth electric controller is a lower-level electric controller of the third electric controller.

20. The vehicle according to claim 14, wherein the at least one second electric controller is configured to forward the first data based on a data processing mode being set to a non-multi-level processing mode, wherein the second data is the first data.

* * * * *